May 10, 1949.  R. S. CUTRIGHT  2,469,815
BOX WELDING MACHINE
Filed Sept. 13, 1946  8 Sheets-Sheet 1

FIG. 1

INVENTOR.
ROBERT S. CUTRIGHT
BY
*[signature]*
ATTORNEY

May 10, 1949.   R. S. CUTRIGHT   2,469,815
BOX WELDING MACHINE
Filed Sept. 13, 1946   8 Sheets-Sheet 2

INVENTOR.
ROBERT S. CUTRIGHT
BY
ATTORNEY

FIG. 4

May 10, 1949.  R. S. CUTRIGHT  2,469,815
BOX WELDING MACHINE

Filed Sept. 13, 1946  8 Sheets-Sheet 4

INVENTOR.
ROBERT S. CUTRIGHT
BY
ATTORNEY

May 10, 1949.  R. S. CUTRIGHT  2,469,815
BOX WELDING MACHINE
Filed Sept. 13, 1946                                          8 Sheets-Sheet 5

INVENTOR.
ROBERT S. CUTRIGHT
BY
ATTORNEY

INVENTOR.
ROBERT S. CUTRIGHT
BY
ATTORNEY

May 10, 1949.  R. S. CUTRIGHT  2,469,815
BOX WELDING MACHINE
Filed Sept. 13, 1946  8 Sheets-Sheet 8

INVENTOR.
ROBERT S. CUTRIGHT
BY
ATTORNEY

Patented May 10, 1949

2,469,815

UNITED STATES PATENT OFFICE 2,469,815

BOX WELDING MACHINE

Robert S. Cutright, Akron, Ohio, assignor to Wingfoot Corporation, Akron, Ohio, a corporation of Delaware Application September 13, 1946, Serial No. 696,919

3 Claims. (Cl. 113—59)

The present invention relates to an improved form of welding apparatus. More particularly, the invention pertains to an apparatus for holding and manipulating a work piece embodying a plurality of individual parts in properly assembled relation for joining the same together by a welding operation.

It has been found to be advantageous in the manufacture of certain types of work pieces, especially those involving a plurality of elements such as side and end wall panels, to fabricate metal cases, boxes, and other forms of rigid enclosures to produce the several parts by a forming operation, assemble them, and, while retaining them in assembled relation, weld them to the desired shape. These products are usually of such size that they cannot be formed to the desired shapes by a drawing operation by virtue of the limitations imposed by the elasticity of the material. It is ofttimes desirable also to provide a completely moisture-proof container, a result which cannot be achieved with riveting or spot-welding operations.

It is an object of the present invention to provide apparatus capable of positive mechanical manipulation of the assembled parts of a work piece with respect to a fixed welding torch to produce a continuous welded seam about the outer periphery thereof.

Another object of the invention is to provide apparatus for the production of a continuous seam weld about work pieces of a variety of different shapes to insure a completely moisture-proof product.

A further object of the present invention is to provide apparatus for manufacturing, according to a more advantageous procedure embodying fewer manual operations and less expenditure of time, a lighter, stronger, and better product.

It is a still further object of the present invention to provide a means for producing a uniform product entirely free from defects and imperfections of manual operations which seriously affect the quality of the product.

Other objects and advantages of this present invention will become apparent as the description of a typical form of box welding apparatus, illustrated in the accompanying drawings embodying the principles of the present invention, proceeds.

Figure 1:
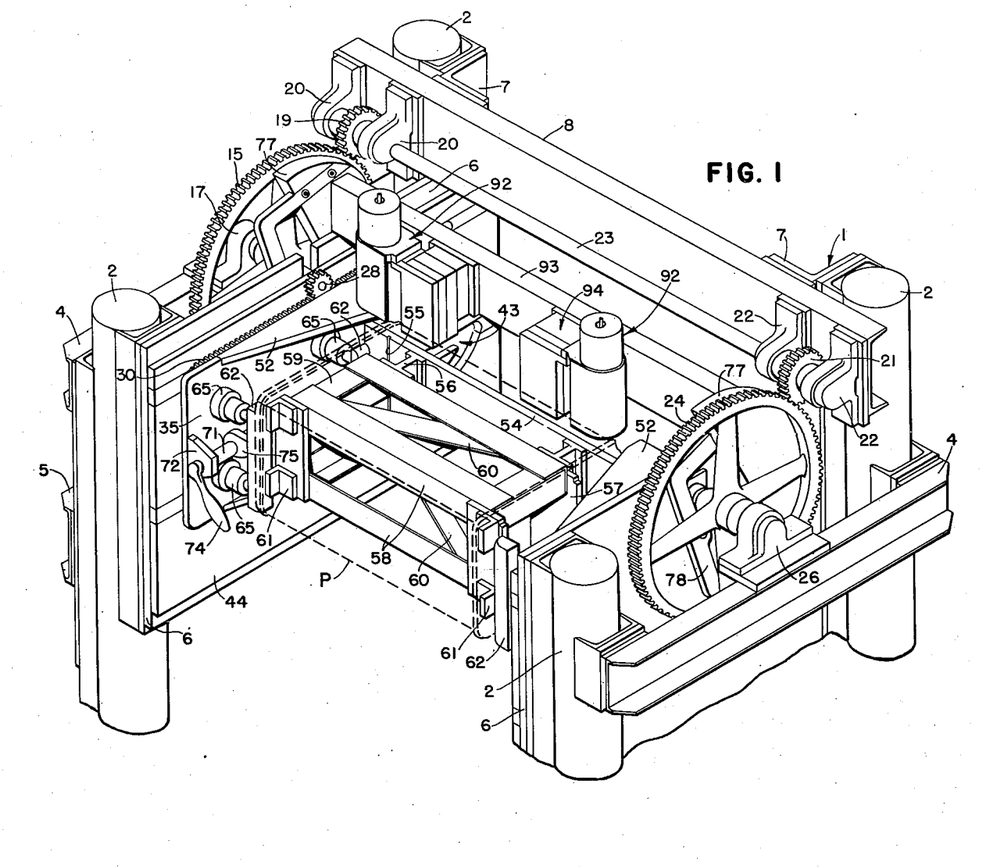
Fig. 1 represents a perspective view of one form of apparatus which is advantageously adapted to function in accordance with the teachings of the present invention.

The welding apparatus illustrated in Fig. 1 and represented generally by the reference numeral 1 is adapted to hold and manipulate a multiple part work piece in assembled relation and in proper alignment with respect to one or more welding torches to enable the several parts of the work piece P (shown in dotted outline) to be joined together in the form of an air-tight, fully enclosed container. The welding apparatus 1 comprises a plurality of vertically extending supporting members or columns 2 which are secured to a base casting 3. A pair of horizontally disposed channel members 4 are secured to each pair of vertical columns 2 in substantially parallel relation to the base casting 3 for supporting the work-holding and drive mechanism of the machine.

A horizontal channel member 5 is secured to one of the pairs of vertical columns 2 below and in generally parallel relation to the channel member 4 thereon. The vertical columns 2 also support on the opposite sides of each pair thereof from the horizontally disposed channel 4 a pair of flat plates 6. One of each pair of vertical columns 2 is slightly longer than the other to accommodate an angle 7 secured thereto which in turn supports a horizontal channel member 8 extending transversely of the machine between the two vertical columns.

Figure 2:
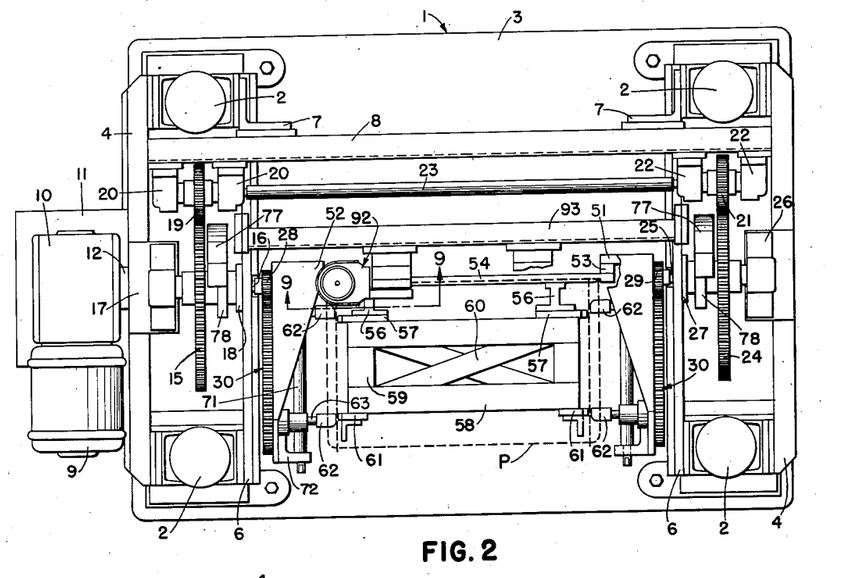
Fig. 2 is a plan view of the machine illustrated in Fig. 1.
Figure 3:
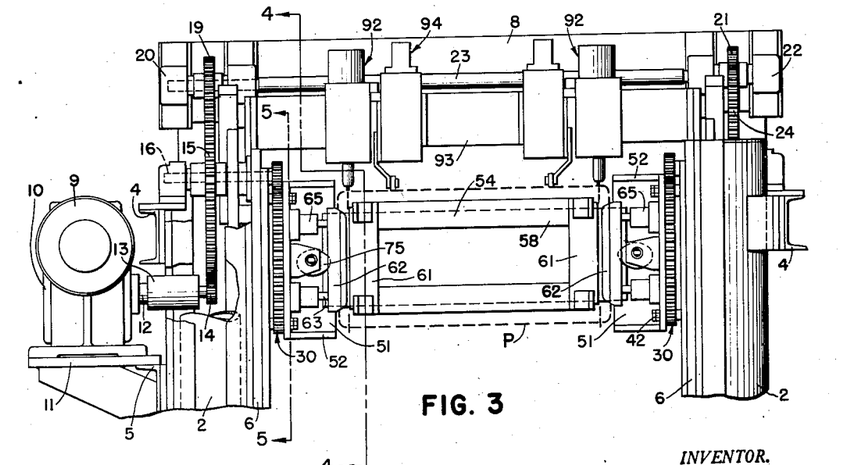
Fig. 3 is a partial front elevation of the machine as seen in Fig. 2 with parts broken away.

A motor 9 directly connected to a speed-change mechanism 10 is advantageously mounted upon a platform 11 supported by the horizontal channel member 5. The motor 9, through the speed-change mechanism 10, is adapted to drive the work manipulating elements of the welding apparatus 1. The output shaft 12 of the speed-change mechanism 10 is provided with an adaptor 13 affording a driving connection for a small driving gear 14 which meshes with a large driving gear 15 supported by a horizontal shaft 16. The horizontal shaft 16 is supported at one end in a bearing bracket 17 mounted on the horizontal channel member 4 and at its other end in a bearing 18 mounted on the outer side of the plate 6 as seen in Figs. 2 and 3.

The large driving gear 15 meshes with and drives a small gear 19 rotatably supported by bearing brackets 20 secured to the face of the transverse channel member 8. A small gear 21, identical to gear 19, is mounted in suitable bearing brackets 22 secured to the transverse channel member 8 and is driven by the gear 19 through a horizontally disposed connecting shaft 23 extending transversely of the machine in generally parallel relation to the transverse channel member 8. The gear 21 intermeshes with and drives a driving gear 24 which is identical to the large driving gear 15 on the opposite side of the machine. This driving gear 24 is rotatably supported by a drive shaft 25 mounted in the bearing 26 secured to the horizontal channel member 4 and a bearing 27 formed on the face of the plate 6.

The several gears 14, 15, 19, 21, and 24, together with the transverse connecting shaft 23, serves to transmit the drive from the speed-change mechanism to both sides of the apparatus, thereby requiring only a single prime mover and insuring positive uniformity in the driving relationships of the several work manipulating elements of the welding apparatus 1. The shafts 16 and 25 advantageously extend through the plates 6 and carry on the ends thereof a pair of drive gears 28 and 29. The drive gears 28 and 29 mesh in driving engagement with the gear teeth of a continuous rack member 30 and assist in supporting and manipulating the work piece P in a manner to be more fully described hereinafter.

Figure 8:
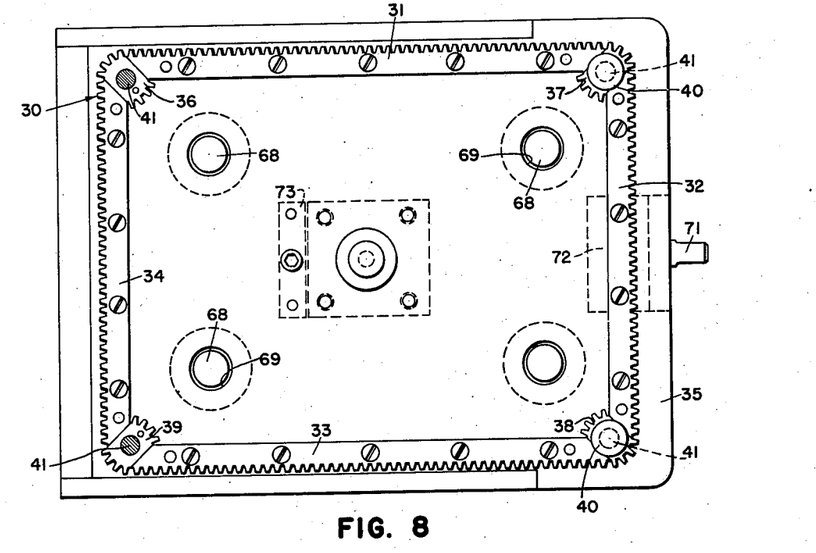
Fig. 8 is a vertical cross-section taken generally along the line 8—8 in Fig. 7 with parts in elevation.

The continuous rack member 30, as will be seen in Fig. 8, is made up of a series of rack bars 31, 32, 33, and 34 mounted upon the face of and spaced inwardly from the margin of a plate 35. The several racks bars 31 to 34, inclusive, are assembled together with gear segments 36, 37, 38, and 39 so as to form the continuous gear track or rack member 30 for driving contact with a gear 28 or 29. Thus, as the gears 28 and 29 are driven by the shafts 16 and 25 on which they are mounted, they serve to rotate the spaced plates 35 by meshing with a portion of the rack members 30 thereon in a continuous path of travel corresponding generally to the peripheries of the plates 35.

Each of the pair of spaced plates 35 is supported by means of a series of rollers 40, one of which is freely rotatably mounted upon the free end of a generally cylindrical post 41 secured to the plate 35 by means of the lock nuts 42 adjacent each of the four corners of the generally rectangularly shaped plate. The posts 41 extend through the bores of the gear segments 36, 37, 38, and 39. As will be seen from Fig. 7, the several rollers 40 for each of the plates 35 is adapted to engage a grooved path 43 formed in the stationary member or plate 44 which is in turn supported by the vertical plate 6.

The grooved path 43 may follow any suitable predetermined path depending upon the nature of the work piece P to be inserted in the machine for the welding operation. In the present instance, the work piece P, shown in broken lines as being a generally rectangularly shaped container having one open side wall which is adapted to have affixed thereto a sealing cover member, is inserted in the machine for purposes of illustration. It will be understood that any one of several different forms of work pieces P, other than the type indicated in the drawings, may be employed without in any way departing from the spirit and scope of the present invention. For each different size or shape of work piece, different plates 35 and 44 may readily be inserted in the machine 1.

Figure 5:
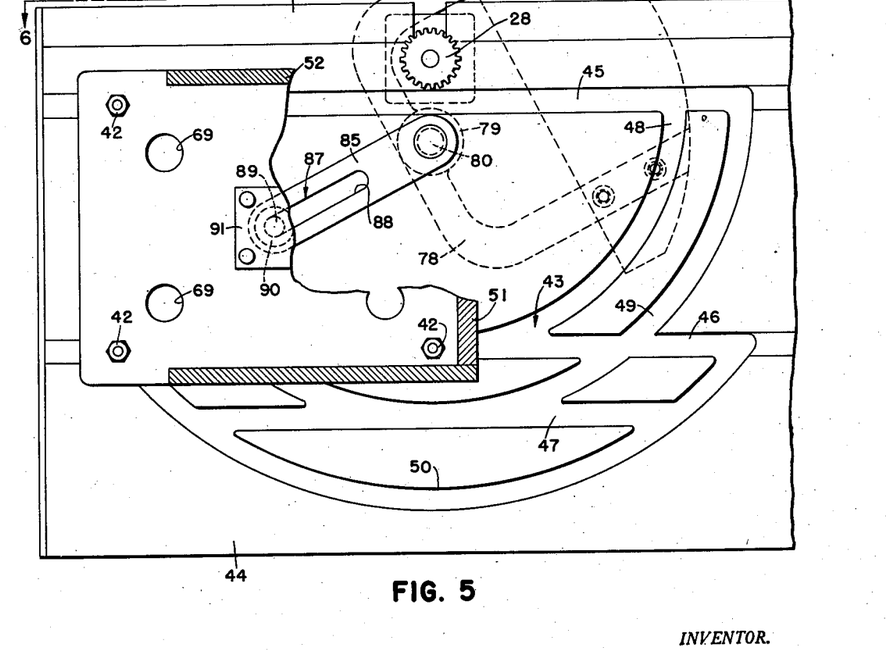
Fig. 5 is a vertical cross-section as seen from the line 5—5 in Fig. 3.

The grooved path 43 (see Fig. 5) in the present instance comprises a series of horizontally disposed straight grooves 45, 46, and 47 with which are interconnected a series of arcuately shaped grooves 48, 49 and 50 to define the entire cycle through which the container must travel in order to insure a completely welded joint about the ends of the rectangular box. The several rollers 40 are adapted to be moved throughout the grooved path 43 traversing each of the several grooves 45 to 50, inclusive, in the plate 44 by the action of the driving gears 28 and 29 in engagement with the rack members 30 on the plates 35. Thus, as the drive gear 28, seen in Fig. 5 of the drawings, rotates in engagement with the rack member 30, the plate 35 is caused to move through a predetermined cycle as defined by the engagement of the rollers 40 with the grooved path 43 comprising the several grooves 45 to 50, inclusive, on the plate 44 as well as the shape of the rack member to rotate the plate 35 and the work piece P one complete revolution.

While the grooved paths 43 in the plates 44 serve to a certain extent to define the cycle through which the work piece P will be manipulated, the dimensions and shape of the rack members 30 will also be determinative of its motion. This cooperative relationship will be apparent from the fact that the rollers 40 cannot engage a new groove in the grooved path 43 until the driving gears 28 and 29 meshing with the rack members 30 reach a change of position. The several elements including the grooved paths 43, rollers 40, rack members 30 and driving gears 28 and 29 also cooperate to support the carriage in which the work piece P is held.

The carriage in which the work piece P is securely held as it is rotated during the welding operation comprises the pair of plate 35 on the outermost faces of which the rack members 30 are mounted together with suitable clamping members and locating means to be described hereinafter. It will be understood that the locating means may vary slightly, depending upon the size, design, and construction of the work piece P.

Figure 4:
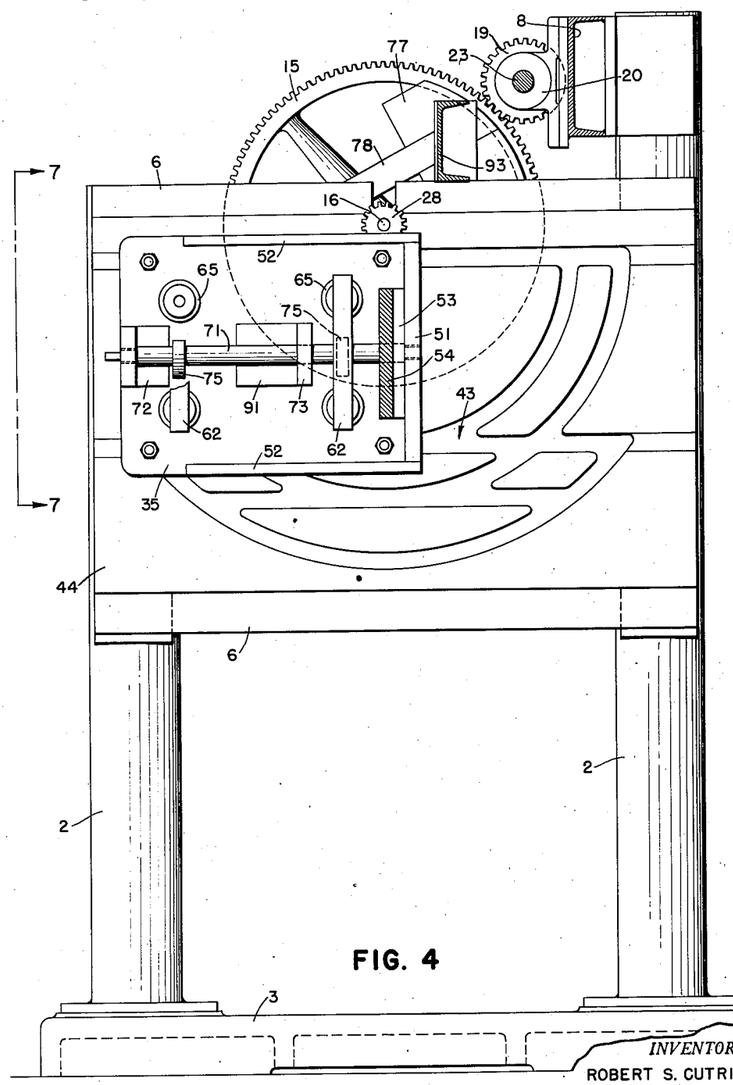
Fig. 4 is a vertical cross-section of the machine of Fig. 3 taken along the line 4—4 therein.

As will best be seen from Figs. 2, 3, and 4, each plate 35 is provided with a back flange plate 51 held in place thereon by means of gusset plates 52 at the top and bottom thereof. On the face of each flange plate 51 (see Figs. 2 and 4) is disposed a spacer bar 53 to which is secured a transversely extending back plate 54. The back plate 54 is provided with vertically extending milled grooves 55 adjacent the supported ends thereof (see Fig. 7) to receive the edges of the elements at the open end of the work piece P when it is inserted and clamped in place in the carriage. This back plate 54 is particularly advantageous when the work piece P takes the form of a box having one open side, but may be dismounted entirely or redesigned when a completely closed container is being built up.

The back plate 54, as shown in Fig. 2, has a pair of T-section members 56 mounted on the face thereof in spaced mutually parallel relation and extending in a vertical direction. The T-section members 56, in turn, support locating members 57 adapted to serve as stops against the inner surfaces of the end walls of the work piece P. Locating members 57 have attached thereto a suitable framework made up of transverse angles 58, cross angles 59, and diagonals 60 (see Fig. 1) in the form of an open crate which will fit internally of the work piece P and carry the locating members 61. It will be understood that the entire frame just described can be rendered exceedingly light in weight by employing parts of aluminum or other suitable light weight alloys.

The work piece P is held securely in place between the innermost faces of the plates 35 by means of a pair of spaced generally parallel guide bars 62 adjustably supported from each of said plates as will be seen from Figs. 2, 3, and 4. Each guide bar 62 is adjustably supported from the plate 35 by a pair of rods 63 secured to the bar as by means of the pins 64 and mounted for axial movement in the generally cylindrical members 65 in the bore 66 of each of which a bushing 67 is press fit (see Fig. 7). Each rod 63 is provided with a headed portion 68 capable of registration with a hole 69 in the plate 35 as seen in Figs. 7 and 8 and received in the counter-bore 70 arranged in adjacent coaxial relation to the hole 69.

A crank rod 71 is rotatably mounted in the angle bracket 72, support 73, and the back plate 51. A suitable wrench or crank 74 (see Fig. 1) is provided to rotate the crank arm 71 in its supports, thereby actuating a pair of spaced cams 75 which are keyed to the crank rod 71. The cams 75 are disposed in proper axial alignment along the crank rod 71 so as to register with the guide bars 62 to urge the same against the end walls of the work piece P in opposition to the action of the springs 76 disposed between the headed portion 68 of the rods 63 and the bushing 67 in the cylindrical members 65.

A counterweight 77 is provided in the welding apparatus 1 for the purpose of balancing or compensating for the weight of the work piece P and the carriage in which it is disposed while the work piece is manipulated throughout the entire cycle of its rotation. The counterweight 77 operates in the nature of a pendulum and thus serves to reduce the load on the driving mechanism as well as to prevent the possibility of damage to the driving gears during those times in the maneuvering of the work piece when the drive would ordinarily be subjected to unequal loads. In this way, a smooth operation of the apparatus in the complete rotation of the work piece P at a constant speed is insured at all times.

Figure 6:
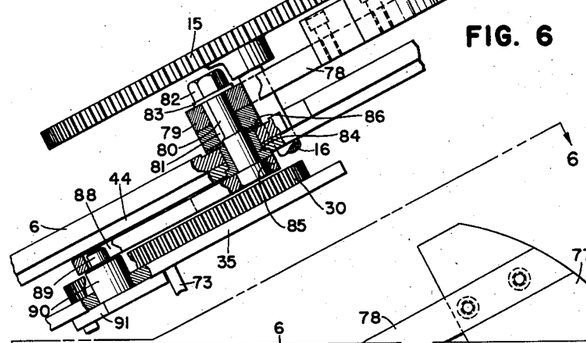
Fig. 6 is a true plan view, with parts in section and broken away, illustrating a portion of the machine as seen from the line 6—6 in Fig. 5.
Figures 7, 18:
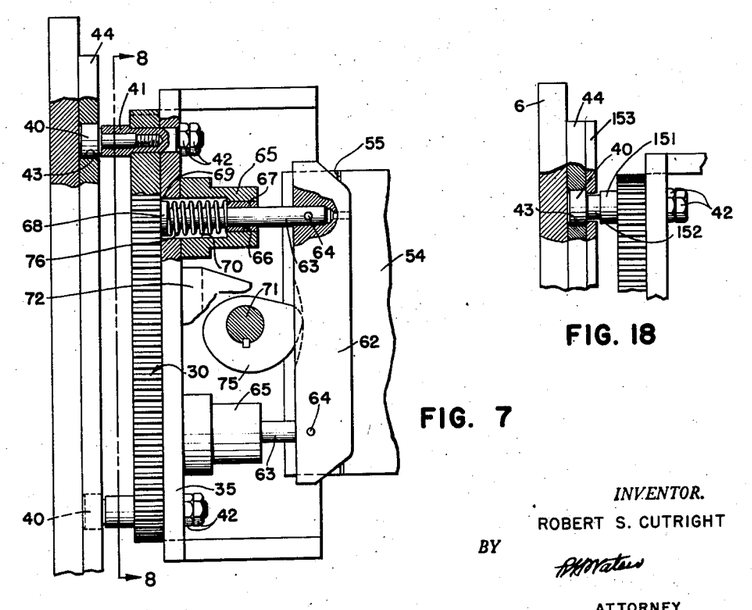
Fig. 7 is a partial front view of the machine illustrated in Fig. 4 as seen from the line 7—7 therein with parts in section and broken away.
Fig. 18 is a fragmentary view illustrating one of the modified forms of the apparatus embodying the teachings of the invention.

The counterweight 77, as seen in Figs. 6 and 7, is supported for pendular movement by means of a yoke 78 on which is formed a hub 79. The hub 79 is secured to a stub shaft 80 by means of a key 81, a nut 82, and a washer 83. The stub shaft 80 extends horizontally through the plates 6 and 44 in a bushing 84 so as to interconnect with an arm 85. A suitable form of wear ring 86 may be employed between the face of the hub 79 and the plate 6 where the stub shaft 80 passes therethrough. The arm 85 is provided at the end opposite its connection to the stub shaft 80 with a lost motion connection 87 embodying a slot 88 which extends axially of the arm 85. The slot 88 is adapted to receive a roller 89 which is in turn secured in place in a generally cylindrically shaped abutment 90 which has a mounting flange 91 formed integral therewith.

The generally cylindrical abutment 90 is adapted to extend through an opening drilled in the plate 35 in such fashion that the mounting flange 91 may be brought into contiguous relation with the innermost face of the plate 35 to enable it to be secured thereto. The lost motion connection 87 between the arm 85 and the plate 35 affords complete freedom of movement to the plate as it is moved through its complete cycle of rotation when driven by the gears 28 or 29 meshing with the rack member 30 associated therewith. It will be understood that the counterweight construction embodying the weight 77, yoke 78, arm 85, together with its associated connections, is also provided for the other plate 35 on the opposite side of the machine.

The welding apparatus 1 is so constructed that it may employ one or more welding torches in connection with the welding operation to be performed by the machine, depending solely upon the number of welds required in the construction of the work piece P. The torches 92 employed in the illustrated embodiment of the invention may take any of several different conventional forms, the apparatus being capable of producing satisfactory results with the electric arc type of torch employing helium or argon gas, as well as the acetylene type employing welding rods. The machine has been illustrated as embodying a pair of electric arc type torches since these eliminate the necessity of providing complicated feeding mechanisms for the welding rods.

Figures 9, 10, 22, 23:
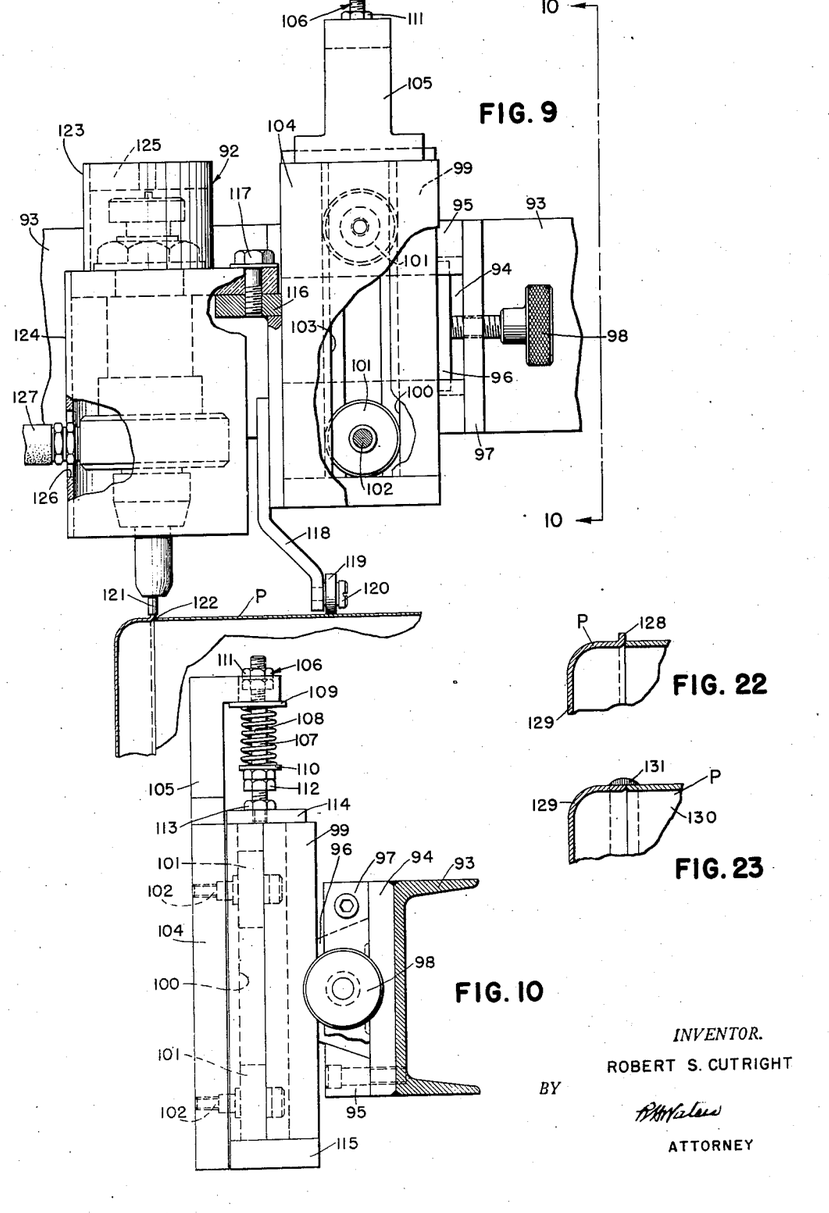
Fig. 9 is a front elevation of a part of the machine illustrated in Fig. 2 as seen from the line 9—9 with parts broken away.
Fig. 10 is a vertical cross-section taken along the line 10—10 in Fig. 9.
Figs. 22 and 23, respectively, illustrate the joint between the several parts of the work piece before and after the completion of the welding operation.

The torches 92, as will be seen from Figs. 1, 2, 3, 9, and 10, are supported from a transverse channel member 93 mounted upon the uppermost ends of the parallel plates 6 disposed on opposite sides of the machine 1. The channel member 93, as will be seen from Fig. 10, is provided with a face plate 94 secured thereto as by means of a welding or brazing operation, said face plate providing the base of an undercut way or guide member 95 which is adapted to receive the slide 96 therein. An end plate 97 is secured to one end of the guide member 95 to provide a fixed abutment for the adjusting screw 98 which is threaded into the adjacent end of the slide 96 to provide a close endwise adjustment of the slide 96 in a direction parallel to the longitudinal axis of the channel member 93.

A casing 99 of generally rectangular cross section is secured to the slide 96 and is provided with an internally disposed groove or track 100 for the reception of a pair of spaced bearings 101. The hub portions 102 of the bearings 101 extend through the opening 103 in the wall of the casing 99 and are secured in place in a plate 104. At the uppermost end of the plate 104 an angle bracket 105 is provided, the horizontally extending leg of which forms an abutment for a connection 106 comprising a threaded rod 107 about which is disposed a coil spring 108 having a pair of washers 109 and 110 at the ends thereof. Nuts 111 are threaded on the end of the rod 107 to form a means of securing the connection 106 to the angle bracket 105.

A pair of lock nuts 112 are provided on the lower end of the threaded rod 107 to facilitate adjustment of the spring 108. The lower end of the connection 106 is secured as by means of a pair of nuts 113 to a cap plate 114 which is, in turn, secured in place at the uppermost end of the casing 99. The cap plate 114 cooperates with a similar plate 115 at the lowermost end of the casing 99 to define the limits of vertical movement of the roller bearings 101 within the channel 100 provided in the casing 99. It will be understood that the mounting just described enables a relatively free and smooth vertical movement of the plate 104 within reasonable limits.

The plate 104 is provided with a shoulder 116 to facilitate the mounting of the torch 92 thereon as by means of a cap screw 117 threaded thereinto. Adjacent the lowermost end of the plate 104 and secured to an edge thereof in depending relation to said plate, is an arm 118 having a small roller 119 secured to its lowermost extremity by means of the screw 120. In the operation of the welding machine 1, the roller 119 is adapted to contact the outer surface of the work piece P as it is being manipulated in the carriage of the machine through its rotating cycle so as to insure the maintenance at all times of a predetermined spacing between the electrode 121 of the torch 92 with respect to the joint 122 of the work piece P which is being welded. The vertical movement of the roller 119 causes the plate 104 to move freely in a vertical direction on its mounting by reason of the resilient connection 106 and the bearings 101.

The torch equipment 92 which may be of any conventional design, as previously indicated, is provided with a pair of generally cylindrically shaped shields 123 and 124 having a cap member 125 at the uppermost end thereof. An opening 126 in the shield 124 is provided for the conduit 127 which supplies gas to the torch 92 when the same is in operation. Suitable electrical connections may also be provided as desired to energize the torch 92.

The joint 122 of the work piece P requires special preparation for electric arc welding operations to provide a source of metal which will be capable of creating the desired fusion between the interfitting elements of the work piece. This may be readily accomplished by forming one of the elements which is to be interfitted with an adjacent element in the fabrication of the work piece with a lip portion 128 formed adjacent the joining line of the element as indicated in Fig. 22 of the drawings. Thus, the element 129 on which the lip is provided may be readily fused to the element 130 in the manner illustrated in Fig. 23.

The lip 128 thus affords an adequate supply of metal which, under the action of the torch 92, becomes a molten pool over a relatively small area defined by the portion of the part surrounded and contacted by the gas envelope created by the torch when it is in operation. A strong glazed weld 131 is formed at the joint which operates effectively to prevent the passage of moisture or gases through the joint between the elements 129 and 130 of the work piece P under all conditions of use.

The method of operation of the welding apparatus 1 is illustrated by the diagrammatic representations of Figs. 11 to 17, inclusive. As previously explained, the carriage in which the work piece P is mounted embodies a pair of spaced plates 35 on which rack members 30 are mounted for engagement with the driving gears 28 and 29, together with other associated apparatus. The motion of the entire carriage and the assembled work piece P will best be understood by tracing the path of travel of just one of the plates 35 with its associated stationary member or plate 44 and the pendular motion of the counterweight 77.

For the sake of clearness, the several edges of the plate 35 will be identified in the diagrammatic representations of Figs. 11 to 17, inclusive, by the letters A, B, C, and D, while the rollers 40 disposed at each corner of the plate will be known as W, X, Y, and Z. The reference character 132 in Figs. 11 to 17, inclusive, represents the axis of the shaft 80 and reference character 133 represents the axis of the roller 89 of the lost motion connection 87 between the arm 85 of the counterweight 77 and the plate 35.

Figure 11:
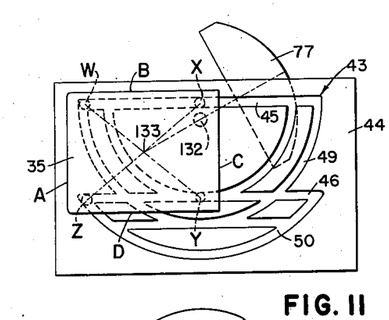
Figs. 11 to 17, inclusive, represent a diagrammatic showing of the method of operation of the material-holding apparatus forming part of the machine illustrated in Fig. 1 and defining several of the steps in the operation of the apparatus.

Referring first to Fig. 11, we note that the plate 35 is in a position such that its rollers 40, identified as W and X, are disposed in the straight groove 45, while the rollers 40, known as Y and Z, are in the straight groove 46 of the grooved path 43 in the plate 44. In this position, the carriage which embodies the plates 35 together with the several locating and locking elements described above, is in its extreme forward position in the welding apparatus 1 as represented by the left hand margin of the plate 44 and is ready at this point for the reception of the assembled elements of the work piece P. The rollers W and Z are positioned at the left hand extremities of the straight grooves 45 and 46, respectively, at which point the counterweight 77 momentarily partially supports the weight of the carriage and the work piece.

Figure 12:
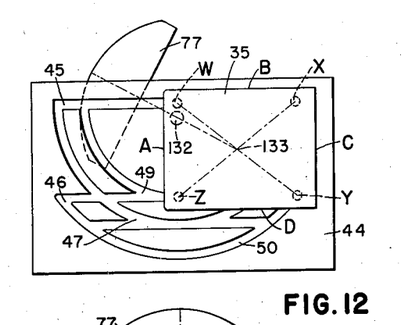

As the driving gear 28 rotates in meshing engagement with the rack member 30, the plate 35 is moved to the position illustrated in Fig. 12 with the rollers X and Y now disposed at the right hand extremities of the straight grooves 45 and 46, respectively. At this point, the rollers X and Y are positioned at the intersection of the straight grooves 45 and 46 with arcuate grooves 49 and 50 and the further actuation of the driving gear 28 will now cause the right hand extremity of the plate 35 to swing downwardly. The counterweight 77, meanwhile, has exactly reversed its position from that shown in Fig. 11 about the point 132 and thus compensates for the weight of the carriage and the work piece P, insuring a positive uniform rotational speed as the plate 35 swings downwardly. It will be understood that the weld on one of the long sides of the work piece P which corresponds to the edge B of the plate 35 will now have been completed.

Figure 13:
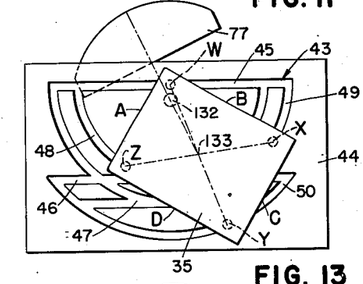
Figure 14:
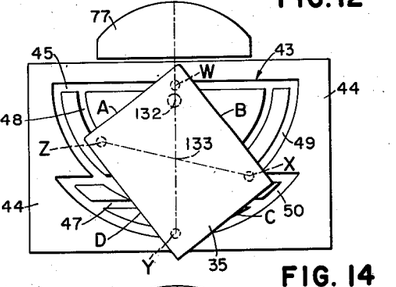

Fig. 13 illustrates a position of the plate 35 in which the rollers X and Y have now traversed a portion of the arcuate grooves 49 and 50, respectively, while the roller Z has reached the intersection of the straight groove 46 and arcuate groove 48 of the groove path 43. The counterweight 77 is pivoted about the point 132 and, by virtue of its connection at the point 133 with the plate 35, offsets the weight associated with the plate in this position. As the plate 35 is continued to be actuated, the roller Z starts upwardly in the arcuate groove 48 and a position of dead center is reached with reference to the counterweight 77. A line through the pivot point 132 and connection 133 of the counterweight 77 then coincides with a diagonal line extending through the axis of the rollers W and Y as shown in Fig. 14. In this position, the roller Z is approaching the intersection of the arcuate groove 48 with the straight groove 45, while rollers X and Y still engaging the arcuate grooves 49 and 50, respectively, are approaching the intersection of these arcuate grooves with the straight groove 47.

Figure 15:
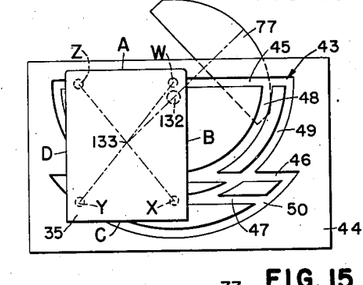

During the interval in which the plate 35 swings from the position shown in Fig. 14 to that of Fig. 15, the torch or torches 92 will weld around the corner of the work piece P. At the same time, the swinging of the counterweight 77 to the right of dead center will tend to overcome the weight of the carriage and the work piece P, causing the same to swing upwardly in a smooth, positive motion, and at the same uniform speed of operation. In Fig. 15, the plate 35 is now ready to begin its travel toward the right to begin the welding of one of the shorter sides of the work piece P corresponding with the edge A of the plate 35.

Figure 16:
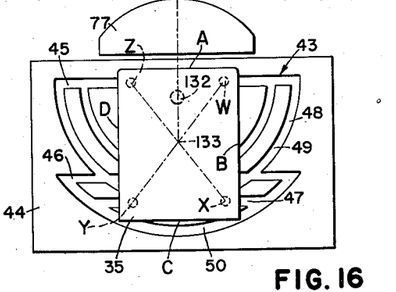

As the plate 35 is actuated by the driving gear 28 in its travel toward the right hand margin of the plate 44, the rollers W and Z are disposed in the straight groove 45, while the rollers X and Y are positioned in the straight groove 47. In this motion, the counterweight 77 passes through dead center and swings downwardly toward the left. Roller W now approaches the intersection of the straight groove 45 and the arcuate groove 48, while roller X simultaneously approaches the intersection of the straight groove 47 and the arcuate groove 50 as shown in Fig. 16. Thus, the weld is completed on the short dimension of the work piece P corresponding to the edge A of the plate 35.

Figure 17:
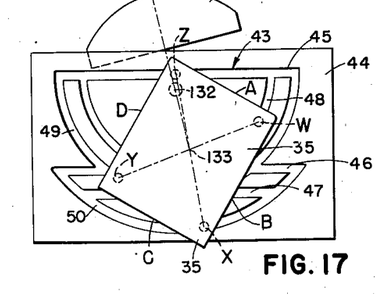

In Fig. 17, the plate 35 has already begun to rotate with the roller W beginning to traverse the arcuate groove 48 while roller X moves in the arcuate groove 50. The counterweight 77 has now begun to move to the left of its dead center position about the point 132 and, by reason of its connection to plate 35 at the point 133, its pendular motion tends to swing the carriage and work piece P into a position corresponding generally to that illustrated in Fig. 11. It will be noted, however, that the plate 35 is then positioned in end-for-end relation to that of Fig. 11, or in other words, with the edge C thereof in the position previously occupied by the edge A of the plate 35 at the starting position of the machine.

In the position now attained by the work piece P, the remaining long side of the work piece corresponding to the edge D of the plate 35 will be subjected to the action of the welding torch or torches 92. The entire cycle of the plate 35 which, as we have seen, represents the path of travel of the work piece P just described, will now be repeated. Eventually the plate 35, and consequently the work piece P, will return to its original starting position corresponding exactly to that shown in Fig. 11 with the edge A of the plate adjacent the left hand margin of the plate 44. When this position is reached, the work piece P is ready to be removed from the machine and a newly assembled work piece inserted therein.

It will be readily understood that with work pieces of various shapes and sizes the plate 44 of the welding apparatus 1 must be revised to suit the conditions imposed by the nature of the work piece to be welded. It is a simple matter to design and install such a new plate 44 in the welding apparatus 1 to enable a new supply of work pieces to be run.

In some instances the dimensions of the work piece are such that the rollers 40 supporting the plate 35 will inadvertently register, or at least partially register, simultaneously with intervening intersections of the grooves in the grooved path 43 of the plate 44. Such an instance is illustrated by the modified plate 134 of Figs. 19, 20 and 21. The plate 134 has a grooved path 135 in which it will be noted that the intersection of the straight groove 136 with the arcuate groove 138 is almost directly above the intersection of the straight groove 137 with the arcuate groove 139. Thus, in the actuation of the plate 35, the rollers 40 thereof in moving from their dotted line position in Fig. 19 to that shown in full lines will pass through the position in which the upper and lower rollers 40 at the left end of the plate 35 will cross the groove intersections just described, tending to cause that end of the plate 35 to swing downwardly.

This tendency of the plate 35 to swing toward the left introduces an uneven travel of the plate 35 at this point and as a consequence may cause a serious irregularity in the position of the work piece P with respect to the electrode 121 of the torch 92. Such irregularities must be avoided in order to prevent the work piece P from being rejected upon inspection due to an imperfect weld or holes burned into the piece. To this end the plate 134 is provided with an automatically operable trip mechanism 140 at one of the pairs of intersecting grooves in the grooved path 135.

Figures 20, 21:
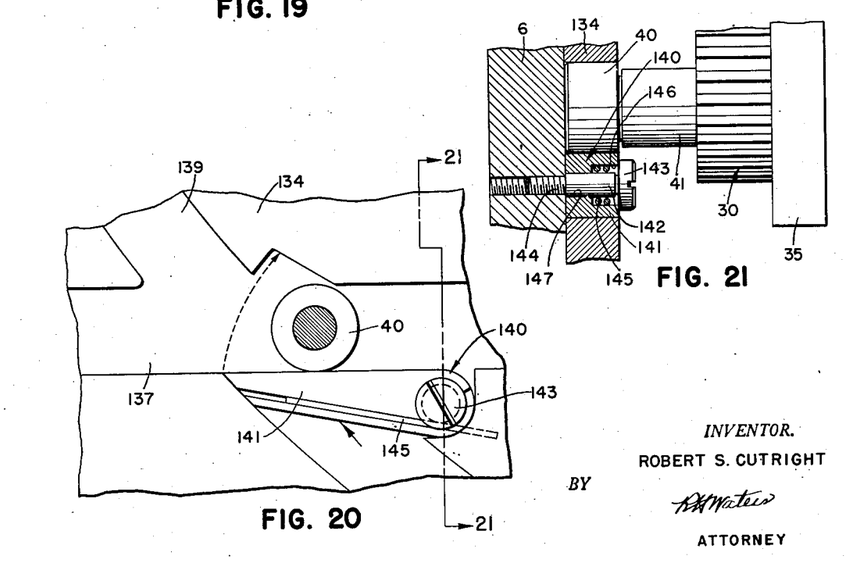
Fig. 20 is an enlarged elevation of a portion of the plate illustrated in Fig. 19 showing the operation of the trip mechanism therein.
Fig. 21 is a fragmentary cross-sectional view as seen from the line 21—21 in Fig. 20.

The trip mechanism 140 embodies a bridge member 141 which is normally positioned as shown in Fig. 20 so as to close the opening of the arcuate groove 139 adjacent the bottom margin of the straight groove 137. The bridge member 141 is mounted in pivotal relation about the shank portion 142 of a machine screw 143 which is threaded into the flat plate 6 as at 144 (see Fig. 21). The bridge member 141 is normally urged downwardly into the position illustrated in Fig. 20 as by means of a spring 145, a portion of which is coiled about the shank portion 142 of the machine screw 143 and received in the countersunk portion 146 of the hole 147 which extends through the wall of the plate 134.

Figure 19:
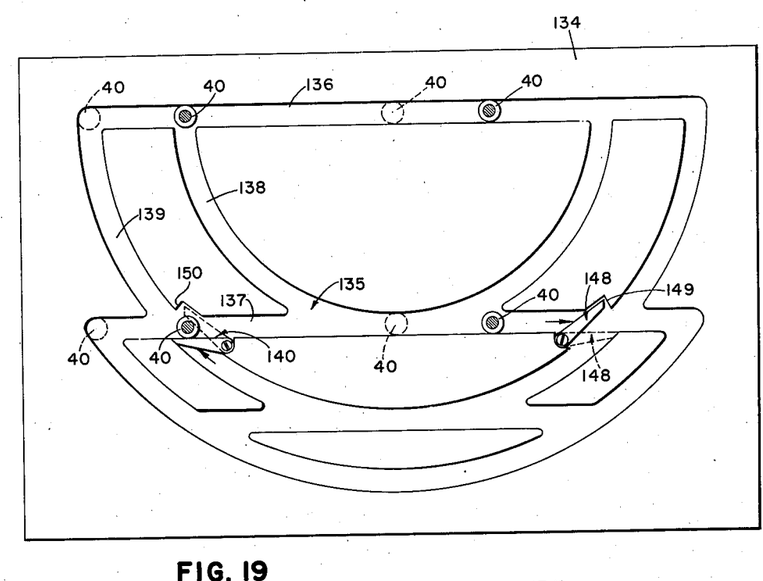
Fig. 19 is an elevation of a modified form of cam plate which may be employed with the apparatus of Fig. 1.

A similar trip mechanism 148 may be provided as shown in Fig. 19 at the intersection of the straight groove 137 with the arcuate groove 139 adjacent the right hand margin of the plate 134. The trip mechanism 148 is identical in construction to that described in connection with the trip mechanism 140 except for the fact that it is normally urged by its spring into the uppermost position as shown. It will be understood that the trip mechanism 148 thus prevents the roller 40 at the right hand corner of the plate 35 from entering the arcuate groove 139 before the upper right hand roller reaches the intersection of the straight groove 136 with the arcuate groove 139.

In the normal position of the trip mechanism 148 shown in Fig. 19, the end thereof is received in a notched portion 149 in the plate 134 until the notch of the plate 35 causes the lower right hand roller 40 thereof to strike the trip mechanism, thereby causing it to swing downwardly against the action of the spring into its lowermost position as indicated by the dotted lines. Thus, the trip mechanism 148 supports the right hand end of the plate 35 until the upper right hand roller 40 has passed over to the right hand extremity of the groove 136. The trip mechanism 148 returns to its normal position in contact with the notch 149 after the lower right hand roller 40 has passed over it, enabling the entire plate 35 to swing downwardly after both of the right hand rollers 40 have registered with the arcuate groove 139 of the grooved path 135.

The action of the trip mechanism 140 previously described is generally similar to that of the trip mechanism 148 except for the fact that it acts in reverse order thereto. It will be seen from Fig. 19 that as the right hand end of the plate 35 swings downwardly with the rollers 40 at the right hand end of the plate traversing the arcuate groove 139, one of the rollers will contact the under portion of the trip mechanism 140 and cause it to swing upwardly against the action of the spring 145 into the notch 150 in the wall of the cam plate 134, permitting the rollers to pass through the intersection of the arcuate groove 139 with the straight groove 137.

Other similar modifications may readily be made in the cam plate to accommodate any design or cross-sectional dimensions of the work piece without in any way departing from the spirit or scope of the present invention.

A further modification of the present invention is partially illustrated in Fig. 18 of the drawings in which it is contemplated that a cantilever supporting mechanism for the work piece be employed. In such operations, there will normally be only a single joint to be welded such, for example, as the attachment and sealing of a cover plate upon a box. The construction of such a cantilever machine would be substantially identical to that of the doubled-end constructed machine hereinbefore described, the second plate 35, rack member 30, stationary member or plate 44, flat plate 6, and other associated elements for one-half of the machine simply being eliminated.

Fig. 18 of the drawings illustrates the method of preventing the disengagement of the rollers 40 from the grooved path 43 in the plate 44 in such a cantilever type machine. The several cylindrical posts 41 of the welding apparatus described above would be machined in the form illustrated by the part 151 in that the outer diameter of the post must be turned down in the area 152 thereof to enable the plate 153 to be secured to the face of the plate 44 and to provide an overhanging lip at the margins of the grooved path 43 therein. It will be understood that, in a cantilever type structure, the counterweight will also tend to counteract the tendency of the plate 35 and its associated elements comprising the carriage on which the work piece is mounted from swinging downwardly to a certain extent about its support, the plate 153 merely operating as an emergency measure to prevent accidental disengagement of the rollers from the several grooves comprising the grooved path 43 in the plate 44.

It will be readily understood that numerous modifications may be made in the apparatus of the invention without in any way affecting the spirit or scope of the invention. The shape of the work piece may vary quite widely, ranging from a cylindrical form to a prismoidal form. The welding apparatus of the invention requires only minor revisions to enable it to handle these different shapes of work piece. The path followed by the work supporting carriage will thus be multi-planar or extending in more than one plane.

While in accordance with the patent statutes one best known embodiment of the invention has been illustrated and described in detail, it is to be particularly understood that the invention is not limited thereto or thereby, but that the inventive scope is defined in the appended claims.

I claim:

1. Welding apparatus and the like for producing a continuous contour weld about a work piece of non-circular periphery which embodies a plurality of cooperating parts, said apparatus comprising a frame; a stationary member mounted on the frame including a groove; a carriage; means on the carriage for releasably securing thereon the assembled work piece; a welding torch supported by the frame; means freely rotatably mounted on the carriage for registration with the groove in the stationary member; and drive means actuating the carriage, said drive means cooperating with the rotatably mounted means and the groove in the stationary member for supporting and moving the carriage and the work piece mounted thereon along a predetermined path defined by the groove past the welding torch at a uniform distance and at a uniform speed.

2. Welding apparatus and the like for producing a continuous contour weld about a work piece of non-circular periphery which embodies a plurality of cooperating parts, said apparatus comprising a frame; a stationary member mounted on the frame including a groove; a carriage; a clamping means on the carriage for temporarily holding the assembled work piece; a welding torch adjustably and resiliently mounted on the frame; a plurality of freely rotatable members mounted on the carriage for registration with portions of the groove in the stationary member; drive means actuating the carriage, said drive means cooperating with the rotatable members and the groove in the stationary member to support and move the carriage and the work piece mounted thereon along a predetermined path defined by the groove past the welding torch at a uniform distance and a uniform speed; and a counterweight pivotally supported by the stationary member and actuated by the motion of the carriage to compensate for the weight of the carriage and work piece.

3. Welding apparatus and the like for producing a continuous contour weld about a work piece of non-circular periphery which embodies a plurality of cooperating parts, said apparatus comprising a frame; a pair of spaced stationary members mounted on the frame, said members including identical grooves; a carriage disposed between the stationary members; clamping means on the carriage for temporarily holding the assembled work piece; welding torches adjustably and resiliently supported by the frame; a plurality of rollers freely rotatably mounted on each end of the carriage for registration with portions of the groove in the adjacent stationary member; drive means embodying a rack and gear on each end of the carriage for actuating the same, said drive means, rollers and the grooves in the stationary members with which the rollers register cooperating to support and move the carriage and the work piece mounted thereon along a predetermined path defined by the grooves past the welding torches at a uniform distance therefrom and at a uniform speed; and a counterweight pivotally supported by each of the stationary members and actuated by the carriage to compensate for the weight of the carriage and work piece.

ROBERT S. CUTRIGHT.

REFERENCES CITED

The following references are of record in the file of this patent:

UNITED STATES PATENTS

| Number | Name | Date |
|---|---|---|
| 1,238,257 | Butler | Aug. 28, 1917 |
| 1,499,499 | Bienenstok | July 1, 1924 |
| 2,313,393 | Mitchell | Mar. 9, 1943 |
| 2,349,865 | Hawk et al. | May 30, 1944 |